(12) United States Patent
Kardeis et al.

(10) Patent No.: US 7,535,135 B2
(45) Date of Patent: May 19, 2009

(54) BRUSHLESS ELECTRIC MOTOR AND INSTRUMENT FOR A MEDICAL APPARATUS

(75) Inventors: Richard Kardeis, Burmoos (AT); Roland Sevcik, Bad Reichenhall (DE); Johann Eibl, Mattighofen (AT); Rainer Schröck, Lamprechtshausen (AT); Harald Schörghofer, Bergheim (AT); Rainer Mackinger, Ostermiething (AT); Wolfgang Wendtner, Lamprechtshausen (AT); Dieter Köbel, Laufen (DE)

(73) Assignee: W&H Dentalwerk Burmoos GmbH, Burmoos (AT)

(*) Notice: Subject to any disclaimer, the term of this patent is extended or adjusted under 35 U.S.C. 154(b) by 0 days.

(21) Appl. No.: 10/856,379

(22) Filed: May 27, 2004

(65) Prior Publication Data

US 2005/0162028 A1    Jul. 28, 2005

Related U.S. Application Data

(63) Continuation of application No. PCT/EP02/14422, filed on Dec. 17, 2002.

(30) Foreign Application Priority Data

Dec. 17, 2001   (DE)   ................ 101 61 945

(51) Int. Cl.
    *H02K 11/04*   (2006.01)
(52) U.S. Cl. ................ 310/68 D; 310/90
(58) Field of Classification Search ........... 310/68 D, 310/48, 156.05, 90; 433/131
    See application file for complete search history.

(56) References Cited

U.S. PATENT DOCUMENTS

| | | | |
|---|---|---|---|
| 4,484,115 A | 11/1984 | Takahashi | 310/254 |
| 4,501,997 A | 2/1985 | Mueller | 310/254 |
| 4,588,914 A * | 5/1986 | Heyne | 310/156.11 |
| 4,741,094 A * | 5/1988 | Denk et al. | 29/598 |
| 4,942,322 A * | 7/1990 | Raybould et al. | 310/156.11 |
| 5,347,187 A * | 9/1994 | Tsuzaki et al. | 310/40 MM |
| 5,770,933 A * | 6/1998 | Larson et al. | 318/254 |
| 5,864,192 A * | 1/1999 | Nagate et al. | 310/156.05 |
| 6,126,442 A * | 10/2000 | Knorpp et al. | 433/126 |
| 6,132,213 A * | 10/2000 | Knorpp et al. | 433/131 |

(Continued)

FOREIGN PATENT DOCUMENTS

CH    670 017 A    4/1989

(Continued)

*Primary Examiner*—Nguyen N Hanh
(74) *Attorney, Agent, or Firm*—Matthew K. Ryan; Jon E. Gordon; Frommer Lawrence & Haug LLP

(57) ABSTRACT

A brushless electric motor which has a rotor magnet, a coil apparatus for electromagnetically driving the rotor magnet, a rotor shaft for transmitting a rotary movement, which is firmly connected to the rotor magnet and runs through a rotation axis of the rotor magnet, and at least one electromagnetic transducer element for detection of the magnetic field of the rotor magnet, in which the at least one electromagnetic transducer element is arranged outside the axial extent of the rotor magnet with respect to the rotation axis, and is arranged essentially within the maximum radial extent of the rotor magnet. The invention also relates to an instrument for a medical, in particular a dental, apparatus having a brushless electric motor such as this.

14 Claims, 3 Drawing Sheets

U.S. PATENT DOCUMENTS

2001/0011854 A1   8/2001   Heyden et al. .............. 310/254

FOREIGN PATENT DOCUMENTS

| | | |
|---|---|---|
| DE | 38 13 065 A | 11/1989 |
| DE | 197 29 178 A1 | 1/1999 |
| DE | 197 37 702 A | 4/1999 |
| DE | 200 12 673 | 12/2000 |
| DE | 100 33 577 A | 4/2001 |
| DE | 100 02 485 A1 | 8/2001 |
| JP | 2001086721 A  * | 3/2001 |

* cited by examiner

BRUSHLESS ELECTRIC MOTOR AND INSTRUMENT FOR A MEDICAL APPARATUS This application is a continuation of International Patent Application PCT/EP02/14422, filed on Dec. 17, 2002 and published on Jun. 26, 2003 under publication number WO 03/052906 A3 and claims priority benefits of German Application No. DE 101 61 945.6, filed Dec. 17, 2001.

BACKGROUND OF THE INVENTION

The present invention relates to a brushless electric motor which has a rotor magnet, a coil apparatus for electromagnetically driving the rotor magnet and a rotor shaft for transmitting a rotary movement to an element or an apparatus which can be moved. The rotor shaft being firmly connected to the rotor magnet and runs through a rotation axis of the rotor magnet. There is at least one electromagnetic transducer element for detection of the magnetic field of the rotor magnet.

Electric motors such as these are available in various sizes and versions, are used in particular in handheld appliances, in particular medical and especially dental handheld appliances. The motors are used as drive means, for example, for cutting or grinding appliances, in particular for drills.

In order to drive a brushless electric motor such as this correctly and as efficiently as possible, it is necessary, in particular, to drive the coil apparatus, in general a stator winding, as a function of the respective instantaneous position of the rotor magnet. The more accurately the so-called commutation (the offset between the flux of the stator field with respect to the rotor field produced by the rotor magnet) is set, the better is the operating behavior of the motor. The efficiency is improved, less heat is developed by the motor, and higher torques and rotation speeds can be achieved, with high rotation speeds being of particularly high importance with respect to the use of a motor such as this in a medical, in particular a dental, appliance, such as a dental drill.

It has therefore been proposed in the prior art to provide an electric motor, which, in addition to the rotor magnet, has a further, preferably small, control magnet which, in particular is connected via the rotor shaft and has a fixed positional relationship with the rotor magnet. Thus, it is possible by detection of the position of the control magnet, with the position essentially being an angular position during rotation about the rotor shaft, to draw conclusions about the position of the rotor magnet, so that it is possible to drive the brushless electric motor via this "circuitous route".

This option was proposed in order that the electromagnetic transducer elements which are intended to detect the position of the control magnet (and hence indirectly of the rotor magnet) can be arranged at a distance from the coil apparatus and from the stator winding in order that they are not influenced by them.

However, brushless electric motors such as these have the disadvantage that the position of the control magnet must be matched extremely exactly to the position of the rotor magnet. Furthermore, it is necessary to prevent rotation of the control magnet with respect to the rotor magnet before and during operation of the electric motor or during maintenance work, etc, since this would lead to incorrect information with respect to the position of the rotor magnet and of the corresponding rotating field, and would result in the electric motor and the coil apparatus being driven inefficiently.

Complicated adjustment effort must therefore be accepted in order to set up the control magnet in an optimum manner. Furthermore, there is always a risk during operation of the electric motor of the control magnet and rotor magnet rotating with respect to one another, which would once again corrupt the sensor values from the electromagnetic transducer elements.

Furthermore, the production of a control magnet such as this is highly costly, and the control magnets are relatively sensitive, which is further exacerbated by the fact that the control magnets should be kept as small as possible owing to the miniaturization requirements. For this reason they are frequently brittle and can break not only during installation and adjustment but also during operation, thus resulting in the risk of fragments which damage or destroy other parts of the motor.

German Patent Application DE 100 33 577 A1 has disclosed a brushless motor in which electromagnetic transducer elements are arranged adjacent to the coils of a coil apparatus, outside its winding parts and between the coils, even in the external circumference around the rotor magnet.

Since the electromagnetic transducer elements are, however, in this case arranged in the immediate vicinity of the coils and between them, they are heavily influenced by the magnetic field of the coils. Thus, the arrangement of the electromagnetic transducer elements between the coils must be selected very carefully and must be fixed exactly, in order to keep the influence of the coil apparatus as low as possible.

SUMMARY OF THE INVENTION

One object of the present invention is therefore to provide a brushless electric motor which allows an efficient drive, which is as insensitive to defects as possible, in a cost-effective manner, and to provide an instrument for a medical apparatus having an electric motor such as this. A further object of the present invention is to provide a brushless electric motor which has small external dimensions and which has small dimensions in particular in the radial direction, in order to allow use in a medical device, in particular a dental, hand piece, in a particularly highly ergonomic manner. In this case, it is necessary as far as possible to avoid the hand piece having an excessively large diameter. This diameter naturally also depends on the diameter of the electric motor that is used.

According to the invention, there is at least one electromagnetic transducer element arranged outside the axial extent of the rotor magnet with respect to the rotation axis, and is arranged essentially within the maximum radial extent of the rotor magnet.

This requirement is satisfied as soon as at least one area element of the at least one electromagnetic transducer element is arranged within the maximum radial extent of the rotor magnet, even if other area elements of the electromagnetic transducer element possibly project into areas which are arranged outside the maximum radial extent of the rotor magnet.

The at least one electromagnetic transducer element is preferably arranged, however, as far inwards as possible in the radial direction, that is to say in the vicinity of the rotor shaft.

It is also preferable for the axial position of the at least one electromagnetic transducer element to be arranged as close to the rotor magnet as possible.

The preferred arrangement described above allows the at least one electromagnetic transducer element to be operated very accurately. This allows both the positioning of the rotation magnet and the rotor magnetic field to be determined very exactly. This ensures that the coil apparatus is driven particularly accurately and efficiently even when the magnetic flux densities are low.

In one preferred embodiment, the at least one transducer element is a Hall sensor or a Hall board, since reliable measurement values can be achieved in a particularly simple and cost-effective manner using an element such as this.

In a further preferred embodiment, the at least one transducer element is attached directly or indirectly to the coil apparatus itself, so that this makes it possible to ensure that the relative positioning of the at least one transducer element with respect to the coil apparatus and thus with respect to the drive apparatus of the rotor magnet is maintained exactly. However, of course, it is also possible for the at least one electromagnetic transducer element to be attached to any other desired apparatus in the brushless electric motor if all that is required is to ensure defined positioning relative to the coil apparatus.

In principle, it is also possible for the relative positioning between the at least one electromagnetic transducer element and the coil apparatus to be variable, provided only that the relative positioning can be determined at any time, so that it is possible to draw conclusions about the drive required for the electric motor and for the coil apparatus.

In one particularly preferred embodiment, the brushless electric motor is designed such that it has an inner rotor magnet and a radially outer coil apparatus, and electric motors such as these are also referred to as internal rotor motors. In particular, a configuration such as this has the advantage that, for constructional reasons, relatively small radii of the electric motors can be achieved, since the space utilization is considerably better than in the case of so-called external rotor motors, since the coil apparatuses and the coil windings have to be a certain distance away from the rotor shaft and, furthermore, there must be sufficient space for installation.

Particularly in the case of the preferred internal rotor motors, it is preferable for the rotor shaft itself to be in the form of a rotor magnet in the relevant area, that is to say essentially in the area in which the coil apparatus also extends in the axial direction. This allows the design to be further miniaturized in the radial direction. The rotor shaft may itself in this case be formed completely as a rotor magnet in the radial direction. It is also possible for a radial core area of the rotor shaft, that is to say the inner area of the rotor shaft, not to be in the form of a rotor magnet, but essentially only a concentric, outer radial area of the rotor shaft.

In a further preferred embodiment, the rotor shaft has bearings on only one end in order to transmit a rotary movement, while the at least one electromagnetic transducer element is arranged on the face of the rotor magnet opposite the bearing. This creates additional space in the vicinity of the rotation axis in the radial direction on the side of the transducer elements, otherwise, this space would be occupied by parts of the rotor shaft or an associated bearing, so that the at least one electromagnetic transducer element can be arranged in particular even closer to the rotation axis, thus allowing miniaturization, particularly in the radial direction.

In a further preferred embodiment, provision is also made for at least one of the at least one electromagnetic transducer element, in particular a magnetically sensitive semiconductor, especially a Hall sensor, preferably with planar elements, for example circular or polygonal platelets, to be produced from a material which can be influenced magnetically, and to be attached together with the transducer element. These platelets lead to a greater concentration of the magnetic field, thus allowing the Hall sensors to be read particularly sensitively, and thus allowing more exact identification of the instantaneous position of the rotor magnet, and hence more accurate control of the system.

In one particular embodiment, the at least one electromagnetic transducer element is encapsulated with the coil apparatus to form a component. An encapsulating resin is preferably used for this encapsulation process, by which means the relative positioning between the at least one electromagnetic transducer element and the coil apparatus is reliably fixed. Furthermore, the encapsulating resin is also used for protection of the encapsulating components and elements. In this case the component may also include further elements of the brushless electric motor, in addition to the at least one transducer element and the coil apparatus.

In one particularly preferred embodiment, at least three electromagnetic transducer elements, in particular Hall sensors, are provided, and are preferably distributed at uniform angular intervals around the rotation axis of the rotor magnet. Three Hall sensors are preferably provided and are each arranged at angular separations of 120° around the rotation axis, which is particularly worthwhile in the case of a 2-pole rotor magnet. In one embodiment, two transducer elements with an angular separation of 45° may also be provided, in particular for a 4-pole rotor magnet.

In one preferred embodiment, all of the electromagnetic transducer elements are arranged on one axial face of the rotor magnet. This has particular advantages in the situation where it is necessary to disassemble the electric motor since, for example, the rotation shaft can be withdrawn together with the rotor magnet from the coil apparatus without having to remove the electromagnetic transducer elements, which are, for example, attached to the coil apparatus.

Since such disassembly may be necessary regularly during the life cycle of an electric motor, in order, for example, to replace the bearing apparatuses which are subject to high wear. An embodiment such as this ensures that there is no negative influence on the drive for the electric motor even during procedures such as this, for example through shifting of the relative positioning between the transducer element and the coil apparatus, and that there is no need for readjustments after the disassembly and maintenance processes.

However, of course, it is also possible to provide electromagnetic transducer elements on both axial faces of the rotor magnet.

In one preferred embodiment, at least one Hall sensor is arranged such that a normal which runs through the center point of the active surface of the Hall sensor intersects the axis of the rotor magnet. Furthermore, the at least one Hall sensor is preferably arranged in the vicinity of the casing surface of the rotor magnet, but is also arranged such that it is essentially located within the maximum radial extent of the rotor magnet. Such alignment and/or positioning of the Hall sensor leads to particularly accurate measurement results, particularly for the tangential component of the magnetic lines of force, and thus to particularly exact control of the motor. As a result of the method of operation of the Hall sensor and of the alignment of the magnetic field, are matched to one another in the best possible manner with the abovementioned alignment and/or positioning of the Hall sensor.

The electric motor is preferably a motor which is constructed on the principle of synchronous motors and has a permanent magnet, although other motor principles may also be used.

The motor is preferably designed such that it can be sterilized. The motor which can be sterilized is designed such that it withstands temperatures of at least 135° C. and an overpressure of at least 2 bar, as well as a vacuum pressure of at least −0.85 bar. Furthermore, the electric motor which can be sterilized is designed such that it withstands treatment with alcohol or further chemicals that are used for cleaning purposes, and in particular all the sensitive parts of the electric motor can be covered or sealed with materials which withstand the above-mentioned temperatures, pressures and chemical treatment. In particular, it is preferable to provide all of the sensitive components with a protective varnish.

In addition to the electromagnetic transducer elements, a temperature sensor is preferably also provided, in order to monitor the operation of the electric motor, with the temperature sensor preferably being arranged in the vicinity of the end winding of the stator winding, preferably outside the axial extent and/or within the radial extent of the stator. The temperature sensor is preferably likewise arranged outside the axial extent of the rotor magnet and possibly in the vicinity, for example between the electromagnetic transducer elements.

2-pole or 4-pole magnets are preferably used as the rotor magnet for the electric motor according to the invention, although in principle any known magnetic apparatuses may be used for the brushless electric motor according to the invention, without departing from the subject matter of the present invention.

The invention also relates to an instrument for a medical, in particular a dental, apparatus, which is equipped with a brushless electric motor such as that described above. An instrument such as this is preferably a hand piece or an angled piece for dental tools such that the advantages are particularly clearly applicable to this use of a brushless electric motor, specifically high exactness, efficient drive, small physical structure, high motor effectiveness, high torques and, in particular, high rotation speeds.

The small structure and the lack of a possibly provided control magnet and the associated attachment apparatus, in particular, allow further miniaturization and allow the hand piece to be more ergonomic, thus avoiding rapid fatigue in the hand of the operator, for example of a dentist, which is of major importance, particularly in the dental field, in which very exact work must be carried out.

The electric motor described above thus immensely simplifies the integration of the motor, in particular in dental hand pieces and angled pieces.

BRIEF DESCRIPTION OF THE DRAWINGS

These and further advantages and features of the invention will become clear from the attached schematic drawings, which show particular embodiments of an electric motor according to the present invention, and in which.

DETAILED DESCRIPTION OF THE PREFERRED EMBODIMENT

Figure 1:
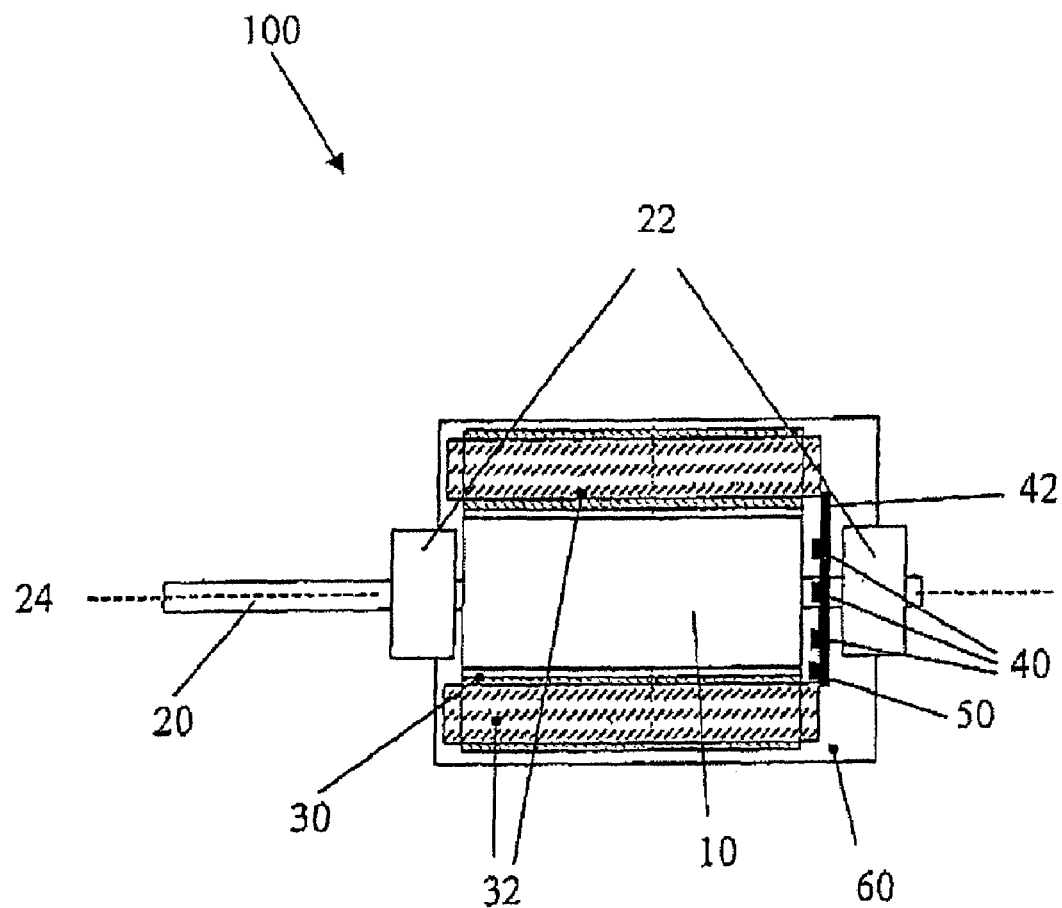
FIG. 1 shows a first embodiment of an electric motor according to the invention with a bearing at both ends.

FIG. 1 shows, schematically, a first embodiment of a brushless electric motor according to the invention, with a main or rotor magnet 10, which is driven by means of schematically indicated stator windings 32 on a stator 30.

The rotor magnet 10 is a 2-pole magnet, whose individual poles each cover an angular range of about 180° in a section plane through the essentially cylindrical rotor magnet 10 running at right angles to a rotation axis 24 of the rotor magnet.

The rotor magnet 10 is firmly connected to a shaft 20, which transmits the rotary movement (which is produced by the stator windings 32 of the stator 30, which are used as a coil apparatus) to moving elements or tools, in particular dental tools such as a drill. The power can be transmitted to the dental tools in various ways, for example directly via gear wheels or in general via a transmission, in which case it is also possible to provide a clutch.

The shaft 20 is held by two bearings 22 such that it can rotate, with these bearings 22 being arranged at both ends of the rotor magnet 10.

A mount board 42, which is firmly connected to the stator 30, is arranged between the right-hand bearing 22 (which is shown in FIG. 1) and the rotor magnet 10, so that the position of the mount board 42 is fixed relative to the stator 30.

The mount board 42 is fitted with a total of three Hall sensors, which are arranged and fixed with a uniform angular distribution, in this case with an angular separation of 120° around the rotation axis 24 or the shaft 20 of the rotor magnet 10.

A temperature sensor 50 is also provided on the mount board 42 and is positioned radially outside the Hall sensors 40, while the axial separation in the rotor magnet 10 corresponds essentially to the axial distance between the Hall sensors 40 and the rotor magnet 10.

The radial distance between the Hall sensors 40 and the rotation axis 24 in this embodiment is approximately half the radius of the rotor magnet 10, while the distance between the Hall sensors 40 and the rotor magnet 10 in the direction parallel to the rotation axis 24 of the rotor magnet 10 is very small and, in this embodiment, is only about 1 mm. At this point, it should be mentioned once again that the drawings are not illustrated true to scale, in order to illustrate the individual elements.

The fixed components are furthermore encapsulated with an encapsulating resin to form a unit 60, which surrounds the stator 30 with its stator windings 32 and the mount board 42, which has already been attached thereto, with the Hall sensors 40, thus fixing the relative position between these elements.

The right-hand bearing 22 which is shown in FIG. 1 is designed to be removable, so that the left-hand bearing 22 as well as the shaft 20 and the rotor magnet 10 can be withdrawn easily.

Figure 2:
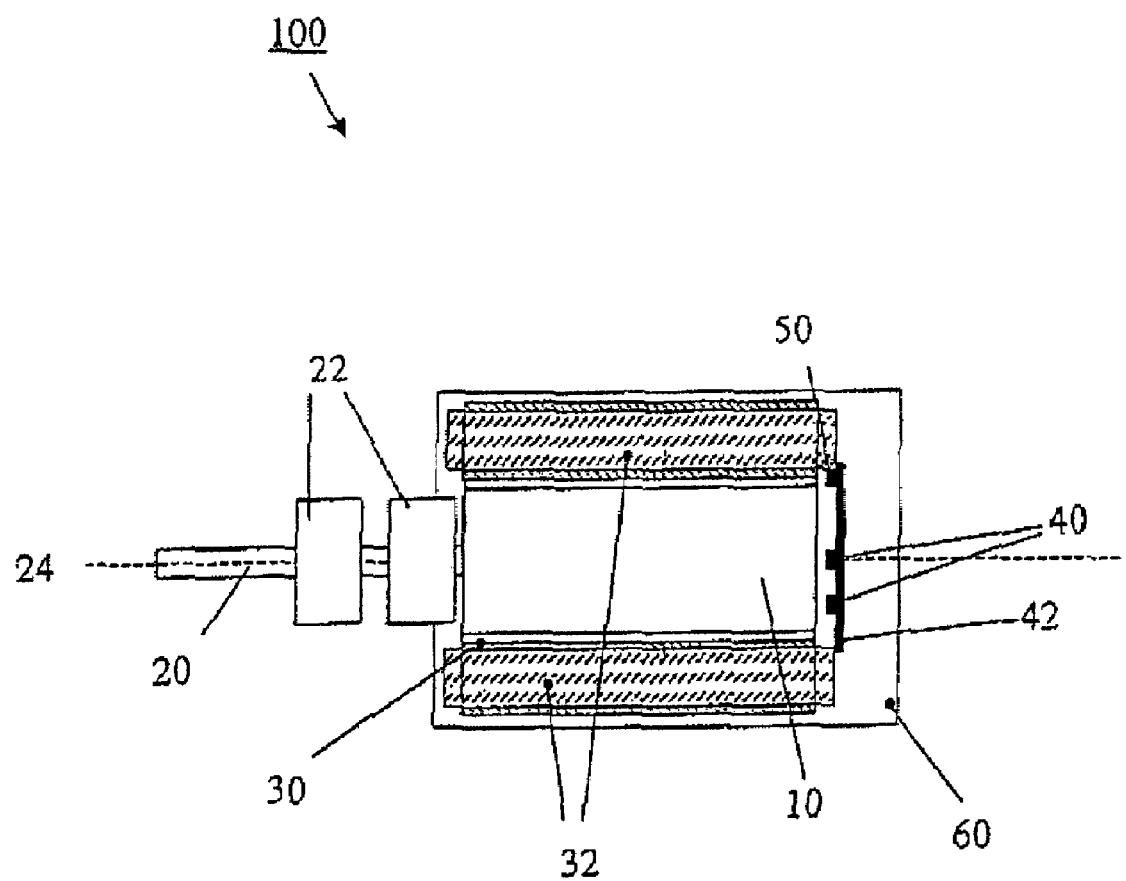
FIG. 2 shows a second embodiment of an electric motor according to the invention, with a bearing at one end.

FIG. 2 shows, schematically, a further embodiment of the electric motor according to the invention, which is very similar to the embodiment shown in FIG. 1. Identical or similar elements are thus provided with identical reference symbols, and reference should be made to the description relating to FIG. 1.

The embodiment shown in FIG. 2 has the same functional components as the embodiment shown in FIG. 1. The electric motor 100 has a 4-pole rotor magnet 10, which is driven by a stator 30 with a stator winding 32, so that it drives a shaft 20 on the one rotation axis 24. A mount board 42 is attached to the stator 30 and to the stator windings 32, and is fitted with a total of two Hall sensors 40, which are arranged with an angular offset of 45° from one another. These elements are also encapsulated, as in the embodiment shown in FIG. 1, to form a component 60.

In contrast to the embodiment shown in FIG. 1, the shaft 20 in the embodiment of the electric motor 100 shown in FIG. 2 is, however, mounted such that it can rotate by means of two bearings 22 at only one point on the rotor magnet 10. At this point, it should be mentioned that, in principle, it is also possible to provide only one bearing instead of the two bearings 22, in particular it is possible to provide one bearing which has a greater extent in the axial direction than the bearing 22 shown in FIG. 22, thus ensuring that the shaft 20 and hence the overall system is more robust.

As can be seen in FIG. 2, the use of a bearing at one end of the rotor shaft leaves more space and thus more design freedom for the positioning of the Hall sensors 40, so that these Hall sensors 40 can on the one hand be fitted axially closer to the rotor magnet 10 and radially closer to the rotation axis 20, thus allowing further miniaturization in both the axial and radial directions.

Figure 3:
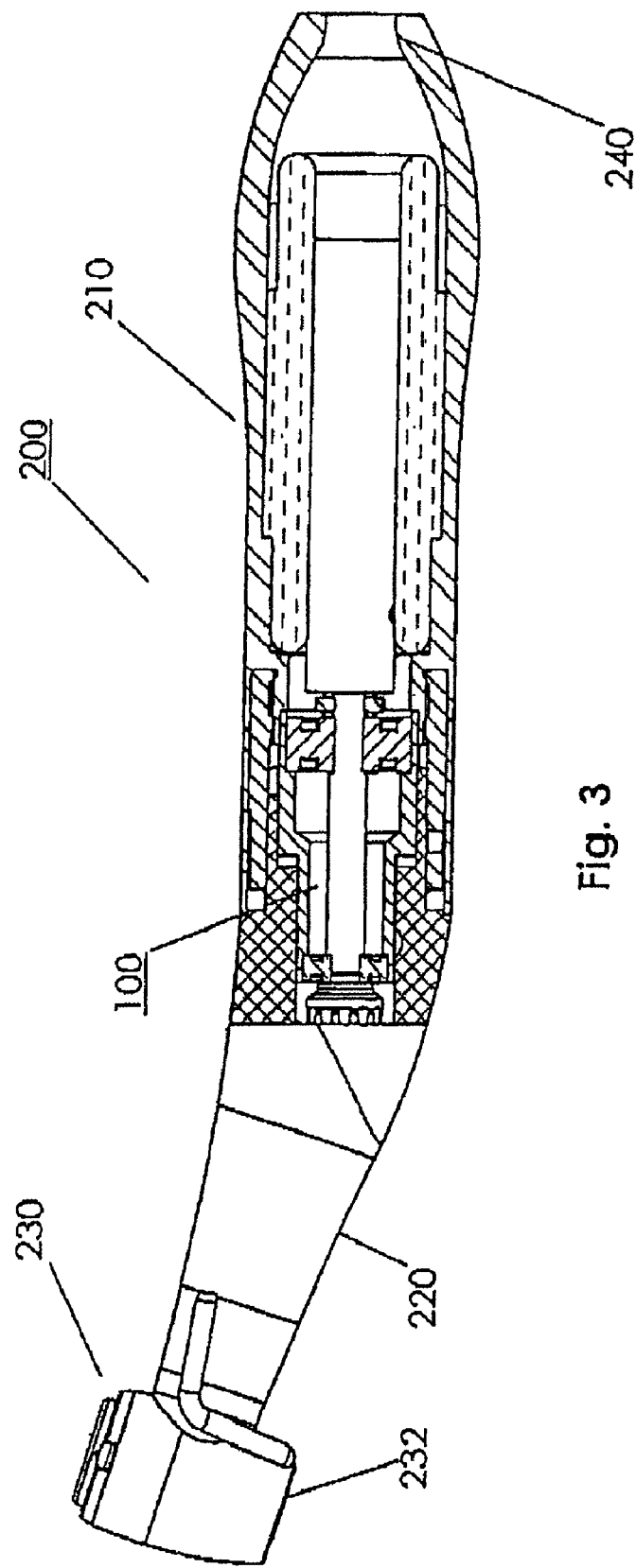
FIG. 3 shows an embodiment of a hand piece according to the invention with an embodiment of an electric motor according to the invention.

The embodiments of the electric motor 100 shown in FIGS. 1 and 2 are embodiments of an electric motor 100 for an angled piece 200 for use in the dental field, as is illustrated schematically in FIG. 3.

FIG. 3 shows, schematically, a partially sectioned illustration of one embodiment of an angled piece 200 according to the invention, with an embodiment of an electric motor 100 according to the invention.

The angled piece 200 is designed to be essentially elongate and has a processing end on which an end winding 230 is provided, which in turn has a connecting area 232 for dental tools, in particular a drill. The angled piece 200 furthermore has a connecting face 240, on which the angled piece can be connected to further appliances, for example to an electrical power supply, or else to supply apparatuses for cooling liquid or other media.

The angled piece 200 first of all runs essentially in a straight line from the connecting face 240, with the electric motor 100 being arranged approximately in the central area of the angled piece 200.

Adjacent to the essentially linear profile of the angled piece 200, the angled piece 200 has a neck area 220 which, for ergonomic reasons runs at an angle to the linear area 210 of the angled piece, with the change in angle being about 15°.

Reference should be made to FIGS. 1 and 2 for the configuration of the electric motors 100 which can be used in an angled piece 200 such as this.

The features disclosed in the above description, in the claims and in the drawing may be significant to the implementation of the various refinements of the invention both individually and in any given combination.

What is claimed is:

1. A handheld medical device including a brushless electric motor comprising:
    a rotor magnet;
    a coil apparatus for electromagnetically driving the rotor magnet;
    a rotor shaft for transmitting a rotary movement, said rotor shaft being firmly connected to said rotor magnet and running through a rotation axis of the rotor magnet;
    at least one electromagnetic transducer element for detection of the magnetic field of the rotor magnet; and
    at least one bearing disposed on said rotor shaft only on a first side of said rotor magnet outside the axial extent of said rotor magnet and no bearings disposed on a second side of said rotor magnet, wherein when more than one bearing is disposed on said rotor shaft, the bearings are disposed immediately adjacent to each other;
    wherein said at least one electromagnetic transducer element is disposed on a second side of the rotor magnet opposite to the first side of the rotor magnet where the at least one bearing is disposed, is located outside the axial extent of the rotor magnet with respect to the rotation axis, is arranged essentially within the maximum radial extent of the rotor magnet, and is attached directly or indirectly to the coil apparatus, being encapsulated with the coil apparatus to form a component; and
    wherein said electric motor is an internal motor in which the coil apparatus is disposed essentially radially outwardly of said rotor magnet.

2. The device as claimed in claim 1, wherein the at least one electromagnetic transducer element is a Hall sensor or a Hall board.

3. The device as claimed in claim 1 wherein at least two electromagnetic transducer elements are arranged around the rotation axis of the rotor magnet.

4. The device as claimed in claim 1 wherein at least three electromagnetic transducer elements are arranged around the rotation axis of the rotor magnet.

5. The device as claimed in claim 3 or 4 wherein all of the electromagnetic transducer elements are arranged on one axial face of the rotor magnet.

6. The device as claimed in claim 1 wherein a temperature sensor is also provided.

7. The device as claimed in claim 6, wherein the temperature sensor is arranged in the vicinity of the end winding of the stator winding.

8. The device as claimed in claim 1 wherein the electric motor is a synchronous motor.

9. The device as claimed in claim 1 wherein the rotor magnet is a two-pole magnet or a multipole magnet.

10. The device as claimed in claim 1 wherein the electric motor can be sterilized.

11. The device as claimed in claim 1 wherein the electric motor has a radially inner rotor magnet and a radially outer coil apparatus.

12. The device as claimed in claim 1 wherein the handheld medical device is for use as a dental tool.

13. The device as claimed in claim 12 wherein the housing is in an angled form for ease of use.

14. A handheld medical device including a brushless electric motor comprising:
    a rotor magnet;
    a coil apparatus for electromagnetically driving the rotor magnet;
    a rotor shaft for transmitting a rotary movement, said rotor shaft being firmly connected to said rotor magnet and running through a rotation axis of the rotor magnet;
    at least one electromagnetic transducer element for detection of the magnetic field of the rotor magnet; and
    a single bearing disposed on said rotor shaft only on a first side of said rotor magnet outside the axial extent of said rotor magnet and no bearings disposed on a second side of said rotor magnet;
    wherein said at least one electromagnetic transducer element is disposed on a second side of the rotor magnet opposite to the first side of the rotor magnet where the at least one bearing is disposed, is located outside the axial extent of the rotor magnet with respect to the rotation axis, is arranged essentially within the maximum radial extent of the rotor magnet, and is attached directly or indirectly to the coil apparatus, being encapsulated with the coil apparatus to form a component; and
    wherein said electric motor is an internal motor in which the coil apparatus is disposed essentially radially outwardly of said rotor magnet.

* * * * *